July 23, 1957 R. F. BLAKE 2,800,584
PULSE POSITION DECODER
Filed Feb. 28, 1952 3 Sheets-Sheet 1

INVENTOR
RICHARD F. BLAKE

BY D. C. Snyder
Howard White
ATTORNEYS

July 23, 1957 R. F. BLAKE 2,800,584
PULSE POSITION DECODER
Filed Feb. 28, 1952 3 Sheets-Sheet 2

*INVENTOR*
RICHARD F. BLAKE

BY D. G. Snyder
Howard White
ATTORNEYS

July 23, 1957 R. F. BLAKE 2,800,584

PULSE POSITION DECODER

Filed Feb. 28, 1952 3 Sheets-Sheet 3

INVENTOR
RICHARD F. BLAKE

BY D. C. Snyder
Howard White
ATTORNEYS

United States Patent Office 2,800,584

Patented July 23, 1957

2,800,584

PULSE POSITION DECODER

Richard F. Blake, Washington, D. C., assignor to the United States of America as represented by the Secretary of the Navy Application February 28, 1952, Serial No. 274,039

8 Claims. (Cl. 250—27)

(Granted under Title 35, U. S. Code (1952), sec. 266)

This invention relates in general to electronic circuits having discriminatory response characteristics and in particular to an electronic circuit for pulse group discrimination.

In radio, radar, television, and numerous other electrical fields, it frequently occurs that a number of different potential variations may exist at the input to a component electronic circuit either fortuitously or by intention. If all of such variations are not to be impressed upon the component electronic circuit, it is necessary to provide some form of intervening electronic circuit which has the ability to discriminate between those variations intended for ultimate application to the component electronic circuit and those variations the effect of which would be undesirable. A suitable characteristic for pulse discrimination which may be used is the spacing or interval occurring between a series of pulses.

Having such a basis for pulse discrimination and a suitable intervening electronic circuit which will react to the chosen basis, many useful applications will follow. For example, a means of pulse coding is provided in which intelligence is conveyed by means of electrical impulses endowed with the chosen characteristic in the form in which it will be favorably received by receiver equipment of the system. All those electrical impulses not so endowed, whether they are deliberately introduced so as to disguise a communication for secrecy purposes or reach the receiver equipment from man-made or natural sources so as to constitute accidental or deliberate interference, are rejected by the intervening electronic circuit. It is, of course, obvious to extend such a pulse coding system to provide a receiver having a plurality of intervening electronic circuits, each so constructed as to select and favor a particular interval or spacing of electrical impulses. In an arrangement of this type, a multiplicity of communication channels may be provided.

It is an object of the present invention to provide a circuit which is responsive only to pulses having a predetermined interval or spacing.

It is another object of this invention to provide a circuit which may be employed between a source of potential variations or electrical impulses and the receiver equipment thereof as an intervening circuit which prevents the receiver equipment from receiving all variations or pulse groups except those having a characteristic and definite pulse interval or spacing.

It is another object of this invention to provide an intervening circuit between a source of potential variations or electrical impulses and the receiver equipment thereof which is sensitive and reacts to a group of electrical pulses of definite and predetermined interval or spacing to produce a single electrical pulse as an output.

It is another object of this invention to provide an intervening electronic circuit between a source of potential variations or electrical impulses and the receiver equipment thereof which is sensitive and reacts to a group of electrical pulses of almost any amplitude which have a definite and predetermined interval or spacing to produce a single electrical pulse as an output.

It is another object of this invention to provide an intervening electronic circuit between a source of potential variations or electrical impulses and the receiver equipment thereof and which intervening electronic circuit is composed entirely of passive elements.

It is another object of this invention to provide an intervening electronic circuit which is capable of handling a pulse group of two, three, four, or even ten pulses which are endowed with a chosen characteristic of a definite and predetermined interval or spacing.

Other objects and features of this invention will become apparent upon careful consideration of the following detailed description when taken together with the accompanying drawings in which:

Figure 1 discloses a typical pulse group for use with this invention;

Figure 4:
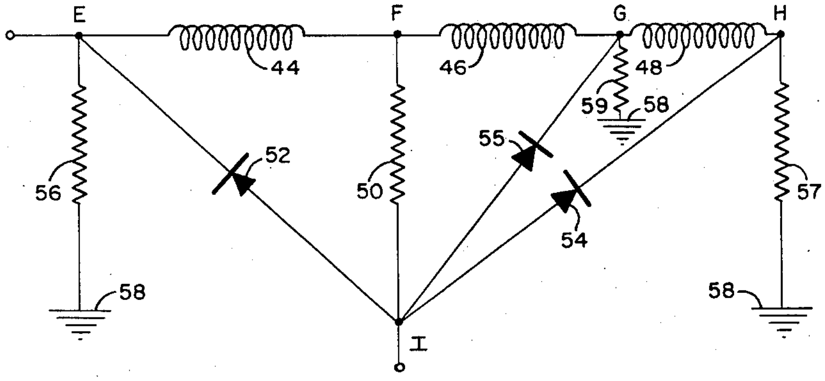
Figure 4 is a diagram of a variant embodiment of this invention.
Figure 5:
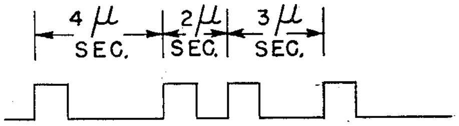
Figure 6:
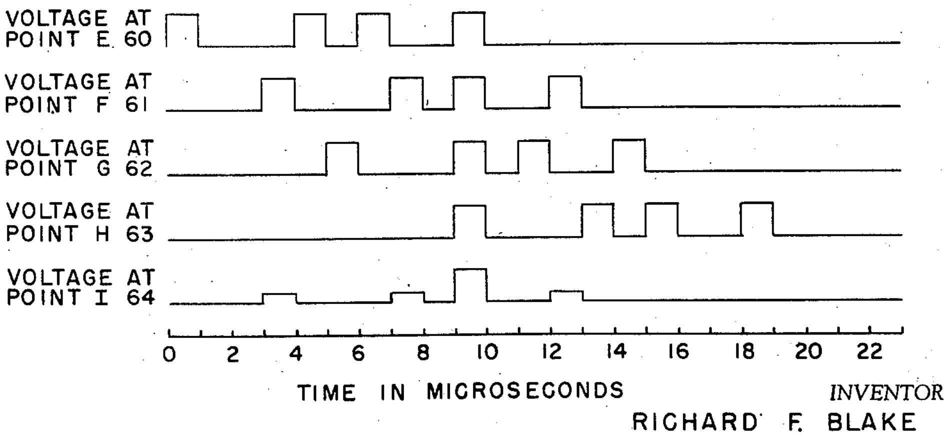
Figure 7:
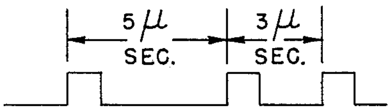
Figure 8:
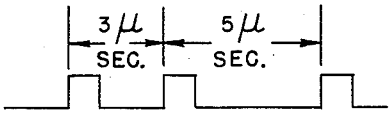
Figure 9:
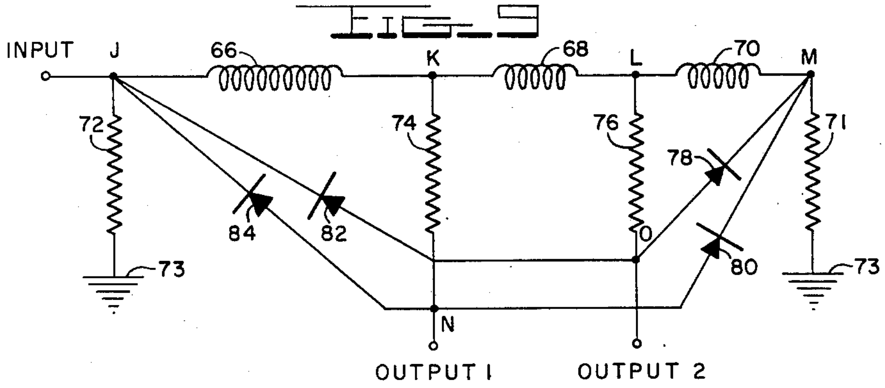

Figure 5 discloses a typical pulse group for use with Figure 4;

Figure 6 is a series of waveforms useful in explaining the operation of Figure 4;

Figure 7 is a typical pulse group for use with the circuit of Figure 9;

Figure 8 is still another typical group for use with the circuit of Figure 9;

Figure 9 is a circuit diagram of another embodiment of this invention; and

Figure 10:
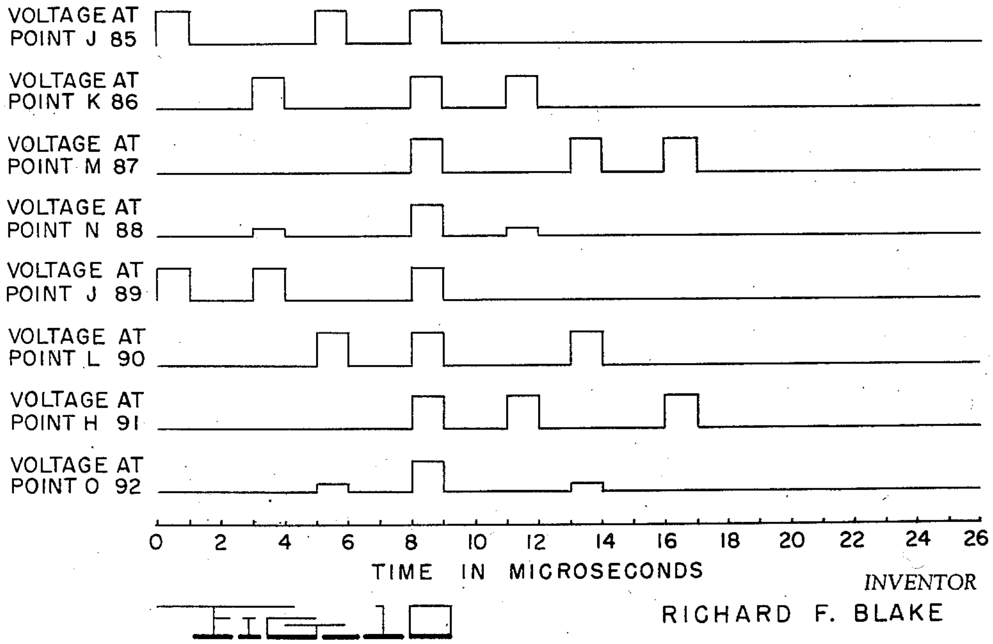

Figure 10 is a series of waveforms useful in explaining the operation of Figure 9.

Briefly, this invention discriminates pulse groups according to the individual pulse spacing by passing each pulse group through a series of delay lines of predetermined delay and comparing the voltage at selected points in the delay lines. Selected points at opposite ends of the delay lines have a low impedance path to ground and are connected to an output terminal through unilateral conducting paths. An intermediate selected point is connected to the output terminal through a high impedance path so that a voltage appears at the output terminal only when the voltage at all selected points is substantially the same. The period of delay between selected points is related in a predetermined manner to the spacing of the pulse group selected.

Figure 1:
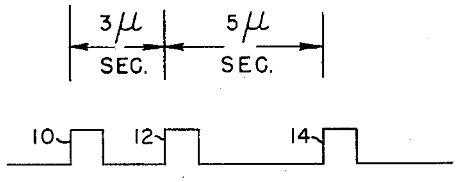

Reference is now had to Figure 1 which shows a group of three pulses 10, 12 and 14 having a predetermined pulse spacing or interval. The time interval or spacing between the leading edge of pulse 10 and the leading edge of pulse 12 is of the order of three microseconds. The time interval or spacing between the leading edge of pulse 12 and the leading edge of pulse 14 is of the order of five microseconds.

Figure 2:
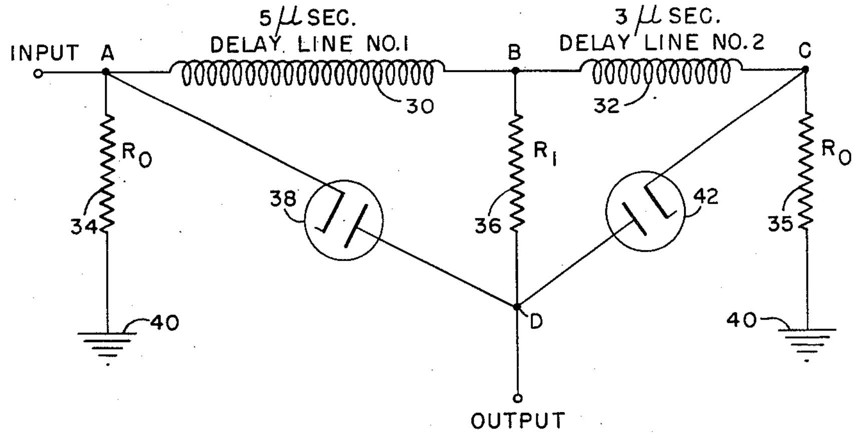
Figure 2 is a circuit diagram of an embodiment of this invention arranged to pass the pulse group of Figure 1.

Referring now to Figure 2, there is shown an embodiment of this invention for selecting only pulse groups having the intervals shown in Figure 1. Various points in the circuit of Figure 2 are indicated by letter. A five microsecond delay line 30 is connected between points A and B, a three microsecond delay line 32 is connected between points B and C. Points A and C are each connected to a common ground 40 through low impedance resistors 34 and 35 respectively. As indicated in the figure by the use of the symbolic legend $R_0$, these resistors are equal to the characteristic impedance of the delay lines. Point B is connected to point D through a high impedance resistor 36. Points A and C are connected to point D through a pair of rectifier tubes 38 and 42 respectively. These rectifiers are so situated that each rectifier tube has its anode terminal connected to point D. It should be noted that either crystal diodes or vacuum diodes may be used for rectifiers 38 and 42.

In the operation of Figure 2 the pulse group is applied to terminal A. Pulse group discrimination is indicated at terminal D by the appearance at D of one pulse for each pulse group having the desired pulse spacing. Consider now the operation of the circuit of Figure 2 when a pulse group as shown in Figure 1 is applied to terminal A: The voltage at terminal A is the same as the Figure 1 waveform and is shown as waveform 20 of Figure 3. The voltage at terminal B is of the same form but is delayed five microseconds because of the action of delay line 30, and is shown at waveform 21 of Figure 3. The voltage at point C is likewise the same waveform but delayed three more microseconds or a total of eight microseconds because of delay line 32, and is shown in waveform 22 of Figure 3. When point A is more positive than either points B or C, as at zero time and again after three microseconds, no voltage appears at point D because of the blocking action of rectifier tube 38. After five microseconds time point B is more positive than either of points A or C as shown in waveform 21 of Figure 3, and the voltage at B is communicated to point D through resistor 36. However, for a positive voltage at B rectifiers 38 and 42 provide a low impedance path to ground through resistors 34 and 35. Therefore, because of the voltage dividing action of high impedance resistor 36 in series with low impedance resistors 34 and 35 in parallel, the voltage developed at point D is insignificant. This is shown in waveform 23 of Figure 3. However, after eight microseconds points A, B and C will all be at a positive voltage, this is represented by the third pulse of the group shown in Figure 1 now reaching point A, the second pulse at point B, and the first pulse at point C. Since points A and C are both as positive as point B, rectifiers 38 and 42 will both be nonconductive and block the low impedance paths to ground produced when only point B is positive. Therefore, no current is drawn from point D, and there will be no appreciable voltage drop across resistor 36; hence, the positive pulse at B will also appear at point D as shown in wavefrom 23 of Figure 3. After eleven microseconds point C alone is positive and, like point A, does not produce an output at point D because of the blocking action of its rectifier tube 42.

Figure 3:
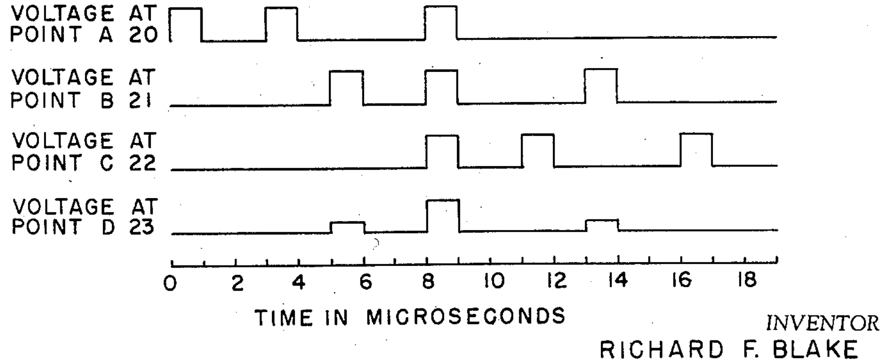
Figure 3 is a series of waveforms useful in explaining the operation of Figure 2.

An examination of the waveforms of Figure 3 reveals that for the input pulse group shown in Figure 1, only on one occasion do points A, B and C reach an equal potential and therefore only once is an output pulse produced at point D. Although this particular circuit and input pulse group do not produce positive pulses simultaneously at any two points in the circuit, it will be seen that no combination of two terminals at a positive voltage will produce an output pulse. For example, if points A and C were both positive each would be blocked from point D by one of the rectifiers, and if both points B and C were positive, the pulse at C would be blocked by rectifier tube 42 and the pulse at B would divide between resistors 36 and 34 to produce only a small voltage at point D. It will be noted that the period between the first and second pulses of the group shown in Figure 1 is the same as the delay introduced by the second delay line 32, and the period between the second and third pulses of the pulse group is the same as the delay introduced by the first delay line 30. This relationship between the pulse group and the discriminator circuit is necessary in order to insure that at one and one time only during the passage of the pulse group through the discriminator circuit, equal potentials will appear at each of the three points A, B and C.

While the operation of the circuit disclosed in Figure 2 has been explained in connection with a series of pulses having the same amplitude as shown in Figure 1, nevertheless, the circuit operation will be substantially the same if a pulse group having pulses of different amplitudes were used. To obtain pulses having the same amplitude all that would be necessary would be the placing of a clipper or limiter circuit in front of the circuit shown in Figure 2. In the event no clipper or limiter circuit is used, the operation of the circuit will not be affected. However, if pulses of different amplitudes were present at points A, B and C of Figure 2 all at the same time, the output pulse at point D would be substantially equal to the pulse of smallest amplitude; and if a pulse occurred at A or C at the same time as one at B but of lesser amplitude, an output would appear at D substantially equal to the difference in amplitude.

Figure 4 discloses another embodiment of the novel circuit which is designed to handle a four pulse group. The delay lines in Figure 4 are of appropriate value to produce an output from the pulse group shown in Figure 5. The delay line 44 is a three microsecond delay line, delay line 46 is a two microsecond delay line, and delay line 48 is a four microsecond delay line. As in Figure 3, the delay lines are connected in series, the opposite ends of the series connection are denoted by the letters E and H. Between point E and ground 58 is a resistor 56. Between point H and ground 58 is another resistor 57. The junction of delay lines 46 and 48 is denoted by the letter G. Between point G and ground 58 is resistor 59. Connected between points F, a terminal between delay lines 44 and 46, and I, the output terminal, is a resistor 50 which is several times larger than resistors 56, 57 and 59. Resistors 56 and 57 like resistors 34 and 35, of Fig. 2, are of a value equal to the characteristic impedance of the delay lines. The value of resistor 59 is not critical but would, of course, be somewhat larger than resistors 56 and 57 in order to avoid reflection and attenuation of the pulse signals. A suitable value for resistor 59 would be of the order of 3 or more times the value of resistors 56 and 57, while resistor 50 should be about 5 or more times the value of resistor 59. Between points E and I is the crystal rectifier 52 which conducts current only from point I to point E. Between points I and H is the crystal rectifier 54 which also only conducts current flowing away from point I. Between points I and G is rectifier 55 which also conducts current only away from I. It is, of course, to be clearly understood that rectifiers 52, 54 and 55 could be diode rectifiers rather than crystal rectifiers, if it were so desired.

Let us now consider the operation of the circuit of Figure 4 when a pulse group as shown in Figure 5 is applied to terminal E. The voltage at terminal E is the same as the Figure 5 waveform and is shown as waveform 60 of Figure 6. The voltage at terminal F is of the same form but is delayed three microseconds because of the action of delay line 44, and is shown at waveform 61 of Figure 6. The voltage at point G is likewise the same waveform but delayed two more microseconds or a total of five microseconds because of delay line 46, and is shown in waveform 62 of Figure 6. The voltage at point H of Figure 4 is likewise the same waveform but delayed four more microseconds or a total of nine microseconds because of delay line 48, and is shown in waveform 63 of Figure 6. When point E of Figure 4 is more positive than either points F, G and H as at zero time and again after four and six microseconds, no voltage will appear at point I because of the blocking action of rectifier 52. After three microseconds time point F is more positive than points E, G and H as shown in waveform 61 of Figure 6, and the voltage at F is communicated to point I through resistor 50. However for a positive voltage at F and therefore I, rectifiers 52, 55 and 54 provide a low impedance path to ground 58 through resistors 56, 59 and 57. Therefore, because of the voltage dividing action of high impedance resistance 50 in series with low impedance resistors 56, 59 and 57 in parallel, the voltage developed at output point I is insignificant. At the end of five microseconds time point G is more positive than points E, F and H as shown in waveform 62 of Figure 6, and no voltage will appear at output point I due to the blocking action of rectifier 55. After nine microseconds points E, F, G and H will all be at a positive voltage, this is illustrated by the fourth pulse of the pulse group of Figure 5 reaching point E of Figure 4, the third pulse reaching point F of Figure 4, the second pulse reaching point G of Figure 4, and the first pulse reaching point H of Figure 4. Since points E, G and H are all as positive as point F, rectifiers 52, 54 and 55 will be non-conducting. Therefore no current will be drawn from point I and there will be no appreciable voltage drop across resistor 50. Therefore the voltage at point F will also appear at point I as shown in waveform 64 of Figure 6. Thus it can be seen from Figure 6 that only on one occasion is an output pulse produced at I. This occasion is at nine microseconds when equal potential exists at points E, F, G and H.

Figure 9 discloses still another embodiment of the novel circuit. This embodiment is designed to handle two pulse groups each having three pulses but possessing different pulse intervals or spacings. In this embodiment delay line 66 is a three microsecond delay line, delay line 68 is a two microsecond line, delay line 70 is a three microsecond delay line. These delay lines are serially connected between points J and M. Between point J and ground 73 is resistor 72. Between point M and ground 73 is resistor 71. Between point K, a terminal between delay lines 66 and 68, and output terminal N is resistor 74 which is larger than resistors 71 and 72. Connected from point N to J is a rectifier 84 passing current only from point N. Connecting point N to point M is a rectifier 80 which also only passes current flowing from point N. Connected between point L, a terminal between delay lines 68 and 70, and output point or terminal O is resistor 76 which is equal in value to resistor 74. Between points J and O is a rectifier 82 passing current flowing only from point O. Between points M and O is a rectifier 78 also only passing current flowing from point O. It is to be noted that resistors 74 and 76 are equal in value and they are both greater in value than resistors 71 and 72 which are also equal in value. Resistors 71 and 72 like resistors 34 and 35, of Fig. 2, are of a value equal to the characteristic impedance of the delay lines.

Now consider the operation of this circuit when a pulse group as shown in Figure 7 is applied to point J. The voltage at point J is the same as the Figure 7 waveform and is shown as waveform 85 of Figure 10. The voltage at terminal K is of the same form but is delayed three microseconds because of the action of delay line 66, and is shown at waveform 86 of Figure 10. The voltage at point M is likewise the same waveform but delayed five more microseconds or a total of eight microseconds because of the action of delay lines 68 and 70, and is shown in waveform 87 of Figure 10. When point J is more positive than either points K and M, as at zero and after five microseconds, no voltage appears at output point N because of the blocking action of rectifier 84. After three microseconds, point K is more positive than either of points J and M, as shown in waveform 86 of Figure 10, and the voltage at K is communicated to N through resistor 74. However for this positive voltage at N, rectifiers 80 and 84 provide a low impedance path to ground 73 through resistors 71 and 72. Thus the voltage dividing action of resistors 71, 72 and 74 causes an insignificant voltage to appear at point N and this is shown in the waveform 88 of Figure 10. At the end of eight microseconds points J, K and M will all be positive since the third pulse of the pulse group of Figure 7 will reach point J, the second pulse will reach point K, and the first pulse will reach point M. Since points J and M are positive, as well as, point K, the rectifiers 80 and 84 will be non-conducting and block the low impedance path to ground 73. Then the positive pulse at K will appear at N as shown in waveform 88 of Figure 10.

Now consider the operation of the circuit of Figure 9 with the pulse group of Figure 8 applied to point J. The voltage at point J is the same as the Figure 8 waveform and is shown as waveform 89 of Figure 10. The voltage at point L is of the same form but is delayed five microseconds because of the action of delay lines 66 and 68, and is shown as waveform 90 of Figure 10. The voltage at point M is likewise the same waveform but delayed three more microseconds or a total of eight microseconds because of the action of delay line 70, and is shown as waveform 91 of Figure 10. When point J is more positive than points L and M, as at zero and after three microseconds, no voltage appears at output point O because of the blocking action of rectifier 82. After five microseconds, point L is more positive than either points J and M, as shown in waveform 90 of Figure 10, and the voltage at L is communicated to point O through resistor 76. However, for this positive voltage at point O, rectifiers 78 and 82 provide a low impedance path to ground 73 through resistors 71 and 72. Thus the voltage dividing action of resistors 71, 72 and 76 causes an insignificant voltage to appear at point O, and this is clearly shown in waveform 92 of Figure 10. At the end of eight microseconds, points J, L and M will all be positive since the third pulse of the pulse group of Figure 8 will reach point J, the second pulse will reach point L, and the first pulse will reach point M. Since points J, L and M are all positive, rectifiers 78 and 82 will be non-conducting and block the low impedance path to ground 73. Then and only then will the positive pulse at L appear at point O as shown in waveform 92 of Figure 10.

The magnitude of the output pulse will be dependent upon the attenuation of the signal through the delay line which limits the maximum spacing used in the code group. The quality of the rejection of an incorrect spacing will be dependent upon the voltage divider network selected. This selection is primarily determined by the stray capacitance in the output circuit and the pulse lengths used. Since the line should be terminated in its characteristic impedance to prevent reflections, and some stray capacitance will always be present, the quality of the rejection is somewhat limited in the practical case, but a ratio of 10:1 in the output between the correct and incorrect codes is easily obtainable. The rejected signal which appears at the output may be eliminated by the use of a biased amplifier.

Thus, there has been disclosed a novel electronic circuit made up of passive elements which allows it to be built to precise specification. Further the circuit operation is independent of pulse amplitude and shape over wide limits. The simplicity of decoding and the nature of the output from the novel electronic circuit makes identification of the proper pulse group relatively simple and there is no need for the use of cathode ray indicators to monitor the pulse groups visually.

Since certain further changes may be made in the foregoing constructions and different embodiments of the invention may be made without departing from the scope thereof, it is intended that all matter shown in the accompanying drawings or set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. A pulse group discriminator for producing output pulses from input pulse groups of predetermined polarity and spacing comprising a plurality of serially connected delay lines each having two terminals, a pulse group input terminal at one end of said series connection, at least one output terminal, separate high impedance means connecting each output terminal to a selected delay line terminal, low impedance means connecting the remaining delay line terminals to ground, and separate unilateral conducting means respectively connecting each output terminal to all of said remaining delay line terminals, each of said unilateral conducting means being poled to block from each output terminal pulses of the predetermined polarity appearing at said remaining delay line terminals, whereby an output pulse appears only when pulses of said predetermined polarity are simultaneously present at said remaining terminals and an output terminal's selected delay line terminal.

2. A pulse group discriminator for producing an output pulse from an input pulse group of a predetermined polarity and spacing comprising, a plurality of serially connected delay lines each having two terminals, a pulse group input terminal at one end of said series connection, an output terminal, high impedance means connecting said output terminal to a selected delay line terminal intermediate to said series connection, separate low impedance means respectively connecting each of the other delay line terminals to ground, and separate unilateral impedance means respectively connected between said output terminal and each of the other delay line terminls, each of said unilateral conducting means being poled to block from each output terminal pulses of the predetermined polarity appearing at said other delay line terminals, whereby an output pulse is produced only when pulses of said predetermined polarity are simultaneously present at all of said delay line terminals.

3. A pulse group discrimintor for producing output pulses from input pulse groups of predetermined polarity and spacing comprising pulse interval discriminator means comprising a plurality of serially connected delay lines having predetermined delay characteristics, a pair of terminals respectively disposed at the remote ends of said series connection of delay lines, one of said terminals being an input terminal, resistance means connected between each of said terminals and ground, output terminals, resistance means of higher value than said first-mentioned resistance means connected between each of said output terminals and points intermediate of said pair of terminals, and a pair of unilateral impedance means respectively connected between each of said output terminals and each of said pair of terminals, each of said unilateral impedance means being poled to block from said output terminals pulses of the predetermined polarity appearing at said pair of terminals.

4. A pulse group discriminator for producing an output pulse from an input pulse group of a predetermined polarity and spacing comprising a plurality of serially connected delay lines each having predetermined delay characteristics, a pair of terminals respectively disposed at the remote ends of said series connection of delay lines, one of said terminals being an input terminal, low value resistance means connected between each of said terminals and ground, an output terminal, high value resistance means connected between said output terminal and a point intermediate of said delay lines, and separate unilateral impedance means respectively connected between said output terminal and each of said pair of terminals, each of said unilateral impedance means being poled to block from said output terminal pulses of the predetermined polarity appearing at said terminals.

5. A pulse group discriminator for producing an output pulse from an input pulse group of a predetermined polarity and spacing comprising a plurality of serially connected delay lines having predetermined delay characteristics, a pair of terminals respectively disposed at the remote ends of said series connection of delay lines, one of said terminals being an inpult terminal, low value resistance means connected between each of said terminals and ground, an output terminal, high value resistance means connected between said output terminal and a point intermediate of said delay lines, and a pair of diode vacuum tubes having corresponding electrodes connected together at said output terminal and their remaining electrodes respectively connected to said pair of terminals, said diodes being poled to block from said output terminal pulses of said predetermined polarity appearing at said pair of terminals.

6. A pulse group discriminator capable of producing an output pulse from either of two pulse groups having the same polarity and number of pulses but different pulse spacings comprising, a plurality of serially connected delay lines having predetermined delay characteristics, a pair of terminals respectively disposed at the remote ends of said series connection of delay lines, one of said terminals being an input terminal, separate low value resistance means connected between each of said pair of terminals and ground, two output terminals, a pair of high value resistance means separately connected between each of said output terminals and first and second predetermined points intermediate of said delay lines, and separate unilateral impedance means connecting each of said output terminals to each of said pair of terminals, said unilateral impedance means being poled to block from said output terminals pulses of the predetermined polarity appearing at said pair of terminals.

7. A pulse group discriminator for producing an output pulse from an input pulse group of a predetermined polarity and spacing comprising a plurality of serially connected delay lines each having predetermined delay characteristics, a pair of terminals respectively disposed at the remote ends of said series connection of delay lines, one of said terminals being an input terminal, another pair of terminals intermediately disposed between said serially connected delay lines, low value resistance means respectively connected between each of said first-mentioned pair of terminals and ground, low value resistance means also connected between one of said second-mentioned pair of terminals and ground, an output terminal, high value resistance means connected between said output terminal and the other terminal of said second-mentioned pair of terminals, and separate unilateral impedance means respectively connected between said output terminal and each of said first-mentioned pair of terminals and to said intermediate terminal having low value resistance means connecting said terminal to ground, said unilateral impedance means being poled to block from the output terminal end of said impedance pulses of the predetermined polarity appearing at the other end of said impedances.

8. A pulse group discriminator for producing output pulses from input pulse groups of predetermined polarity and spacing comprising a plurality of serially connected delay lines each having two terminals, a pulse group input terminal at one end of said series connection, at least one output terminal, separate impedance means connecting each output terminal to a selected delay line terminal, impedance means connecting the remaining delay line terminals to ground, and separate unilateral conducting means respectively connecting each output terminal to all of said remaining delay line terminals, each of said unilateral conducting means being poled to block from each output terminal pulses of the predetermined polarity appearing at said remaining delay line terminals, whereby an output pulse appears only when pulses of said predetermined polarity are simultaneously present at said remaining terminals and an output terminal's selected delay line terminal.

References Cited in the file of this patent

UNITED STATES PATENTS

| | | |
|---|---|---|
| 2,227,906 | Kellogg | Jan. 7, 1941 |
| 2,236,134 | Gloess | Mar. 25, 1941 |
| 2,303,968 | White | Dec. 1, 1942 |
| 2,522,609 | Gloess | Sept. 19, 1950 |
| 2,609,529 | Lesti | Sept. 2, 1952 |

FOREIGN PATENTS

| | | |
|---|---|---|
| 606,314 | Great Britain | Aug. 11, 1948 |